US008566138B2

(12) United States Patent
Nagar

(10) Patent No.: US 8,566,138 B2
(45) Date of Patent: Oct. 22, 2013

(54) SYSTEMS AND METHODS FOR OUTSOURCING SOFTWARE DEVELOPMENT

(75) Inventor: Amit Nagar, Milpitas, CA (US)

(73) Assignee: SAP AG, Walldorf (DE)

( * ) Notice: Subject to any disclaimer, the term of this patent is extended or adjusted under 35 U.S.C. 154(b) by 1574 days.

(21) Appl. No.: 11/544,907

(22) Filed: Oct. 5, 2006

(65) Prior Publication Data

US 2008/0086354 A1 Apr. 10, 2008

(51) Int. Cl.
*G06Q 40/00* (2012.01)
(52) U.S. Cl.
USPC ............................. 705/7.28; 705/37; 705/7.36
(58) Field of Classification Search
USPC ..................................... 705/1, 9, 34, 37, 7.36
See application file for complete search history.

(56) References Cited

U.S. PATENT DOCUMENTS

| 2002/0059512 | A1* | 5/2002 | Desjardins | 713/1 |
|---|---|---|---|---|
| 2003/0208420 | A1* | 11/2003 | Kansal | 705/34 |
| 2004/0143477 | A1* | 7/2004 | Wolff | 705/9 |
| 2005/0114828 | A1* | 5/2005 | Dietrich et al. | 717/101 |
| 2005/0131754 | A1* | 6/2005 | Chapman et al. | 705/10 |
| 2005/0166178 | A1 | 7/2005 | Masticola et al. | |
| 2005/0228622 | A1* | 10/2005 | Jacobi | 703/2 |
| 2006/0015384 | A1* | 1/2006 | O'Neill | 705/8 |
| 2006/0235774 | A1* | 10/2006 | Campbell et al. | 705/30 |

OTHER PUBLICATIONS

Degnan, K.(1991). Risk containment. Satellite Communications, 15(8), 31-31. Retrieved from http://search.proquest.com/docview/213234256?accountid=14753.*
Williamson, M. (1991). Outsourcing: The vendors. CIO, 5(2), 38-38. Retrieved from http://search.proquest.com/docview/205941428?accountid=14753.*
Banks, C. J. (1993). Outsourcing latest trend in information systems. Orange County Business Journal, 16(37), 20-20. Retrieved from http://search.proquest.com/docview/211049661?accountid=14753.*
Carmel, Erran, "Global Software Teams: Collaborating Across Borders and Time," Prentice Hall; 1st edition (Dec. 1998), pp. 33-38, 41-78, 119-139, 147-169, 174-186, and 205-216.
Fitzgerald, Michael, "At Risk Offshore," CIO (Apr. 7, 2004), 7 pages.
Koralak, Dale Walter, "Global Software Development: Managing Virtual Teams and Environments," Wiley-IEEE Computer Society Pr; 1st edition (Dec. 27, 1998), pp. 5-10, 12-14, 16-22, 25-45, 47-50, 54-60, 63-71, 75-85, 89-97, and 101-108.
U.S. Appl. No. 60/538,923, filed Jan. 23, 2004.

* cited by examiner

*Primary Examiner* — Alexander Kalinowski
*Assistant Examiner* — Abhishek Vyas
(74) *Attorney, Agent, or Firm* — Finnegan, Henderson, Farabow, Garrett & Dunner, L.L.P.

(57) ABSTRACT

A method and computer program are disclosed to assist the user in constructing a decision-tree for outsourcing software development business processes. The tree contains a node for the cost of completing the business processes in-house, nodes containing the expected costs of outsourcing the complete business process to different vendors, and nodes containing the expected costs of outsourcing part of the business process to different vendors. The user calculates the expected cost of outsourcing a business process by multiplying the estimated costs for outsourcing the business process by probabilities that risks will occur in the outsourcing process.

18 Claims, 5 Drawing Sheets

SYSTEMS AND METHODS FOR OUTSOURCING SOFTWARE DEVELOPMENT

DESCRIPTION OF THE INVENTION

1. Field of the Invention

The present invention relates to methods and systems for making business decisions and, more particularly, methods and systems for making decisions related to outsourcing software development.

2. Background of the Invention

The outsourcing of software development to low cost centers around the world is an increasing trend. When making the decision to outsource, cost may be one of many factors to consider. However, software development is a complex process, often requiring significant interaction between resources, both internal and external to a software development company, spread across functional boundaries. In addition to seeking input from different internal divisions, a software development company may also need to seek input from customers, functional experts, consultants, and other personnel to successfully develop software.

Customers typically initiate the software development process by generating demand for new products and enhancements for existing products. A "customer" may be any entity that has already bought or is currently using the company's software or may do so in the future. After reviewing the demands of its customers, the software development company may decide to develop new software or modify existing software to meet some or all of the identified demands. After making the decision to proceed with software development, the company undertakes the tasks required to successfully develop the software. In the context of software development, the term "software development company" should not limit the size of the entity developing the software. A "software development company" may constitute a private individual, a multi-national corporation, or any sized entity in between that develops software.

Often, a software development team may be formed with one or more representatives from each of the many functional areas involved in the software development process. For example, a development team may include representatives from product management, pre-sales and sales, research and design, product development, quality assurance, and documentation. Furthermore, the functions of the various groups may interrelate, such that the groups may often consult with each other during the software development process to ensure delivery of a cohesive, working product. For example, the quality assurance group may work closely with at least the product development group to ensure a bug free and functionally complete product.

Some key observations regarding outsourcing of software development tasks may be made based on the descriptions of the functional area. As stated before, the software development process may require input from many different functional groups. The resulting interdependencies have the potential to considerably increase the complexity of the process. Also, some of the tasks may be more strongly linked to other tasks as opposed to others. For example, Sales and Pre-sales are relatively stand-alone tasks as opposed to Quality Assurance, which is tightly integrated to Product Development. As another observation, some core tasks, such as Product Development, for example, drive the product. Finally, some tasks may be performed more efficiently the closer the task is located to the customer base, while other tasks may be performed remotely without affecting the quality of the product or the efficiency of the development process. Once the specifications are written, for example, developers working practically anywhere in the world may write the code. Functions like sales, however, may operate more efficiently the closer the sales group is located to the customer base.

Because of the different functional areas involved and the interactions between these areas, outsourcing software development is a challenging task that involves identifying the processes to be outsourced and selecting an appropriate outsourcing vendor. Outsourcing the software development process or parts thereof without a thoughtful analysis may compromise the operational efficiency and competitive advantage of the organization, leading, in some instances, to major disruptions for the software vendor. Moreover, a failed outsourcing project may have disastrous consequences for the customers of the software development company because of the ubiquitous nature of software in today's business environment. Although the above-mentioned functions are well known in the business community, the prior art lacks a structured approach to assist a software development company in making an informed and considered decision.

It is accordingly a primary object of the invention to provide a structured approach to guide the decision-making process when outsourcing business processes to better ensure that an outsourcing corporation's operational efficiency and competitive advantage will not be compromised.

SUMMARY OF THE INVENTION

In accordance with the present invention, the present disclosure is directed to a method for determining an expected cost to outsource one or more tasks in a business process to a set of vendors. In some embodiments, the method includes the steps of identifying a set of base criteria of the company; identifying a set of risks for outsourcing each task or set of tasks in the business process, the set of risks being based, at least in part, on the set of base criteria; associating one or more risks in the set of risks with each task or set of tasks in the business process to create a risk-profile; determining a set of probabilities that correspond to the occurrence of each of the one or more risks in the risk-profile; determining an estimated cost for each task or set of tasks in the business process; calculating the expected cost as a function of the set of probabilities and the determined estimated cost; and using the expected cost to make an outsourcing decision.

DESCRIPTION OF THE EMBODIMENTS

Reference will now be made in detail to exemplary embodiments of the invention, an example of which is illustrated in the accompanying drawing.

Figure 1:
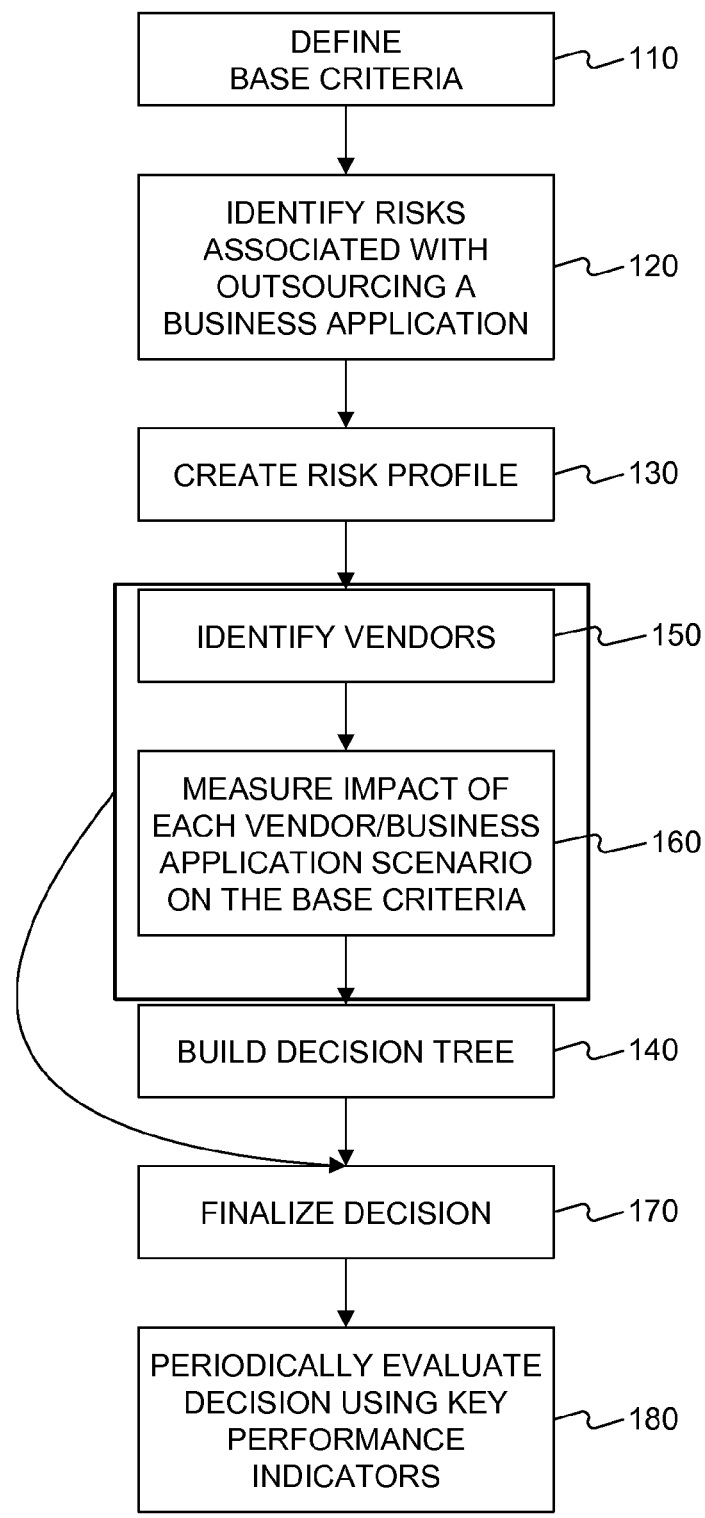
FIG. 1 shows a flow chart illustrating an exemplary decision-making process consistent with the present invention.

FIG. 1 shows a flow chart illustrating an exemplary decision-making process consistent with the present invention. As an initial step 110, the software development company may define a set of base criteria of the company. Base criteria may include, for example, one or more of the costs of software development, the core competencies of the company, and the process flow of the development process. Including the cost of software development as a base criteria may reflect a desire by a software development company to reduce the overall costs of developing software, to curtail price increases in developing future software, or to increase the profitability of the company. Other desires or concerns may lead a company to include costs as a base criteria.

In addition to or instead of costs, core competencies may be included as a base criteria. Core competencies of a software development company may include business or technical processes performed efficiently by the company. For example, certain business processes, such as developing and maintaining a large customer base, may be included as a core competency; certain technical processes, such as developing a relational database, may be included as a core competency. A software development company can have multiple core competencies in each of the areas of business and technical processes.

Process flow may be included as a base criteria. Process flow includes the flow of the development process, from the gathering of information to develop a software product, to defining the requirements and specifications of the new product, and to the process of coding and releasing the new software product. In some embodiments, base criteria may include other concerns reflecting a company's priorities.

A software development company may indicate an organizational preference for each of the base criteria identified in step 110 of FIG. 1. Organizational preferences for each identified base criteria may be determined using any method known in the art of corporate management. Further, base criteria, and preferences between base criteria, may change over time as a result of changes in one or more of economic conditions, corporate management or core competencies, and the process flow. Changing base criteria may necessitate that the steps shown in the flow chart of FIG. 1 be performed again.

A software development company may use the preferences for each base criteria to evaluate possible scenarios for outsourcing different software development tasks. Because each outsourcing decision may affect one or more of these base criteria, pre-specifying the base criteria provides a baseline that the software development company can use when considering which tasks or sets of tasks to outsource. In summary, the base criteria may allow the software development company to identify organizational priorities and take these priorities into consideration during the decision-making process.

As shown in the exemplary flow chart of FIG. 1, step 120 includes identifying one or more tasks to outsource. These tasks may include the tasks identified with software development, such as pre-sales, sales, product marketing, product management, product development, quality management, product support, consulting, and documentation. The software development company may decide to outsource tasks in a manner that minimizes the disruption to the business process. To avoid disruptions to the business process, the software development company can consider the adverse effects that outsourcing different tasks may have on the base criteria identified in step 110. These adverse effects may be grouped into at least three sets of risks—strategic risks, operational risks, and demographic risks. It will be understood that the set of risks and the risks in each group are not exhaustive and should be enhanced as required.

Strategic risks include, for example, loss of innovation, loss of intellectual property, and the possibility of strategic policy diversion between a software development company and an external vendor responsible for outsourced tasks. Outsourcing one or more key functions over a period of time can increase the dependence of the software development company on the external vendor. Over time, this dependence can deplete the technical capabilities of the company, limiting its ability to undertake product development in the future. This risk can be more pronounced with outsourcing of some functions than others. To guard against this risk, the company can determine its core competencies and retain strategic control over functions relevant to these competencies. Further, the software development company decide to take measures to provide increased security for its intellectual property that is sent to an external vendor, especially in the absence of strict and enforceable legal protections of the company's intellectual property from misuse by the external vendor and its employees. There is also the risk of a strategic diversion of policies between the software development company and the external vendor over a long period of time. For example, the external vendor may decide to develop competing products or switch to a totally different product line in the future, forcing the outsourcing company to search for new vendors, an expensive proposition in some instances.

Operational risks may include, for example, integration risk, the risk of knowledge transfer, and the risk of losing control over a product. Integration risk may be high when various sub-processes are being performed in different locations or by different vendors. Information exchange, knowledge transfer, and communication gaps may all lead to integration issues and a loss of control for the company. For example, the risks of information exchange and knowledge transfer may be high when the product architecture or specifications are developed internally and the external vendor undertakes the product development because the vendor may need access to sensitive company documents to develop the product. In this situation, the internal knowledge contained in the product architecture may be passed to an outside vendor, which may use it to the detriment of the software development company.

Demographic risks may include economic downturns, political turmoil in the country to which a task has been outsourced, exchange rate fluctuations, long-term availability of resources, and attrition rates at the outsourcing vendor. Demographic risks may be hard to quantify and difficult to mitigate once a decision to outsource has been made. In some situations, the software development company may have virtually no control over these risk factors, which may be especially pronounced in a company without the resources to move tasks from one geographical location to another. One or more demographic risks may be applicable to locations within the same country. For example, resource availability, resource quality, and attrition rates may vary based on the location of a task within a country.

After identifying the risks, the software development company may create a risk-profile by grouping each identified risk with one or more tasks being considered for outsourcing step 130. In some embodiments, a set of risks may be simultaneously associated with multiple tasks. To assist in identifying risks that may be associated with each task, the software development company can identify the characteristics of each task that may be outsourced. The company may then consider whether these characteristics increase or decrease the probability that a risk may occur. These characteristics may include the ability to perform the task remotely with minimal impact on the business process; the existence of well-defined protocols and the ability to easily monitor the task; having a minimal dependence on other tasks; and allowing the organization to retain control over the business process.

Figure 2:
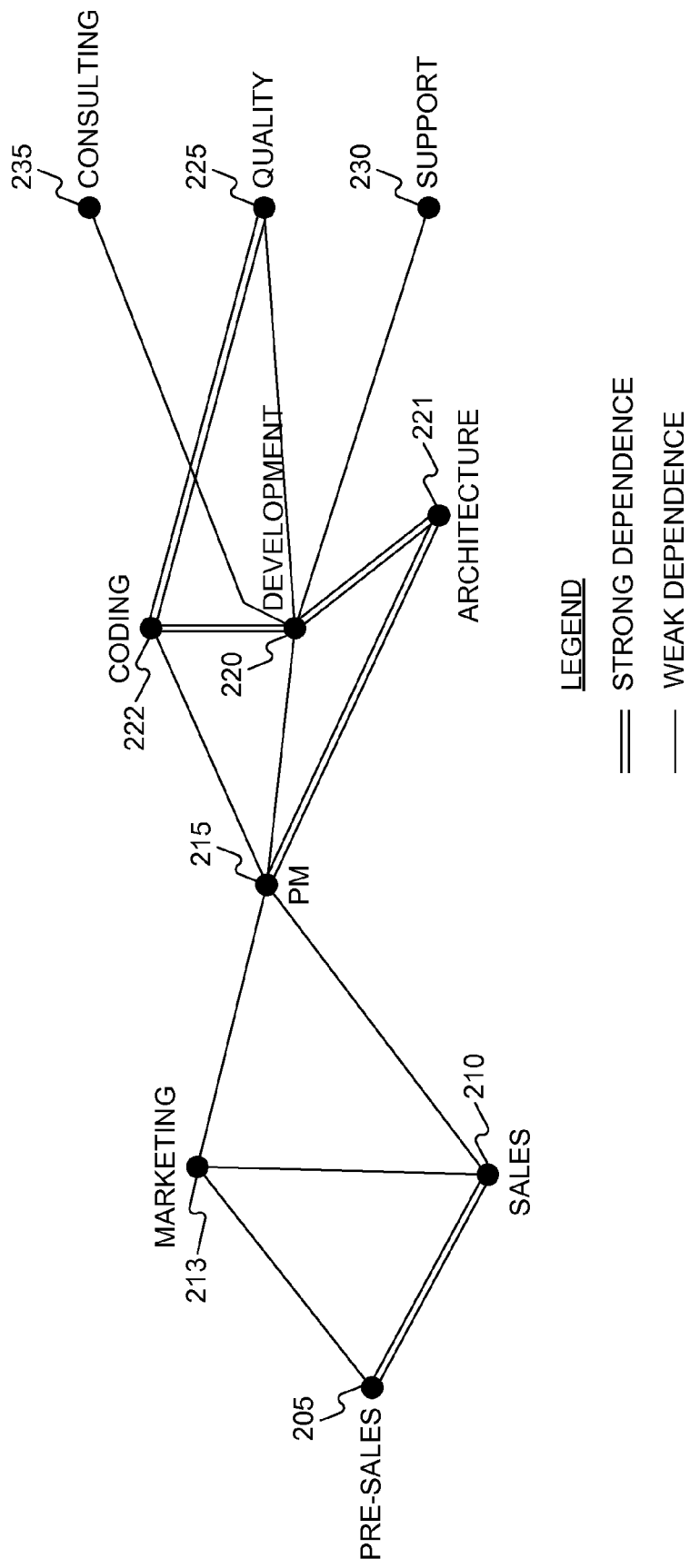
FIG. 2 shows different tasks associated with the outsourcing process as well as some exemplary interdependencies between the tasks.

FIG. 2 shows different tasks associated with the outsourcing process as well as some interdependencies between the tasks. In step 130 of FIG. 1, a software development company may consider the possible risks that may arise from outsourcing each of the tasks shown in FIG. 2. A software development company may incorporate new tasks into, as well as delete tasks from, the structure of FIG. 2. Because a software development company may prefer that Pre-Sales 210, Sales 215, and Marketing 213 be performed close to the customer base to improve the efficiency or the effectiveness of the sales and marketing tasks, a company may choose to exclude these tasks from being outsourced. Accordingly, a company may not proceed to analyze the risk presented by outsourcing these tasks.

The task of Product Management 215 may not be considered for outsourcing if, for example, it plays a pivotal role in defining the product requirements. Allowing an outside vendor to have an active role in defining requirements may eventually lead to losing control over product definition and product direction. Moreover, because product requirements may be largely gathered from the customer base, outsourcing Product Management 215 may lead to inefficiencies as customer information is passed by the company to the outside vendor. Performing Product Management 215 in-house may lead to issues, however, such as knowledge transfer and poor integration between Product Management 215 and other outsourced tasks. This situation may jeopardize product direction, for example, by resulting in missing or incorrectly implemented product features. Accordingly, a software development company may choose to outsource Product Management 215 by considering the company's base criteria.

The tasks of Product Development 220 and Product Architecture 221 may not be considered a good candidate for outsourcing. These tasks may include defining the product architecture, producing design specifications, and coding against the specification. When writing the actual code, developers may work more efficiently if provided with clearly written design documents accurately capturing product requirements. The architecture and design phase may require architects/senior level developers having either or both a technical and product understanding. Technically sound developers may then code against the specification with some guidance from a technical lead. The task of software development therefore places a premium on effectively defining product architecture and design. Outsourcing of either task may have a detrimental effect on the intellectual capabilities of the software development company in the long run.

External vendors may be well suited for doing the actual Coding 222 of the software against the architecture and specifications as developed by the software development company. Outsourcing Coding 222 may present a minimal risk to the software development company while promising substantial cost advantages. Moreover, it may be easier for the company to move to a different vendor for Coding 222 if the need arises. The decision to separate Development 220 and Coding 222 to geographically disparate locations, however, may lead to communication problems. To confront these communication problems, the architects and designers may have to ensure that coding teams understand the design and can correctly code against the specifications. This risk may be one of the biggest sources of concern for some software developing companies. In response to this risk, the company may desire to implement well-defined processes and communication protocols to account for time zone and geographical differences, etc.

The task of Quality Management 225 may present a good candidate for outsourcing for some software developing companies. An iterative process, Quality Management 225 may be closely aligned to Code Development 220. Using the product requirements document prepared by Product Management 215, Quality Management 225 may ensure that the features specified by Product Management 215 are correctly implemented in the final product. The performance of Quality Management 225, and implicitly of Product Development 220, may be easily determined in some software developing companies by remotely monitoring product quality. Thus, the company may have an incentive to carefully monitor the reports prepared by Quality Management 225 to reduce, or even minimize, the risks associated with outsourcing Quality Management 225. Therefore, despite depending on Product Management 215, Quality Management 225 may be outsourced. Some software developing companies may find it advantageous to outsource Quality Management 225 and Coding 220 to the same vendor. Doing so may allow Quality Management 225 to perform its task more efficiently by using the knowledge gained by Coding 220 of the developed software.

Some software developing companies may find Product Support 230 to be a candidate for outsourcing. Acting as a conduit between the customer and the development process, Product Support 230 handles problems experienced by customers using the released product. For some software developing companies, well-defined and time-bound processes may exist to facilitate the smooth functioning of this task. In some instances, outsourcing Product Support 230 may not present significant risks to the organization. For example, the risk of transferring institutional knowledge may be small. In some situations, the risks of losing the ability to innovate or of losing intellectual property associated with outsourcing Product Support 230 may appear small. For some software development company, the biggest challenge may be to accurately measure the quality of the customer support task. The software development company may have as a goal the awareness of customer issues as well as the vendor's response to these issues at all times. To achieve this goal, the software development company may implement a well-defined escalation process in which the software development company itself may become involved with customer problems.

External vendors may be well suited to provide Consulting 235 for some software developing companies. Consulting 235 may have responsibility for deploying and configuring the product at the customer site. As part of these duties, Consulting 235 may have the responsibility for ensuring that the product operates correctly for the customer. In some software developing companies, consultants may be the customer's own trained employees, external consultants provided by the software development company, or consultants employed by a vendor. Consulting 235 may depend on access to training manuals and classes to adequately meet the customers' needs, but this material and training probably will not include sensitive information from the software development company. Consulting 235 may have some contact with Product Development 220 to ensure that the members of Consulting 235 have adequate knowledge of the product to assist customers. The amount and type of conduct between Consulting 235 and Product Development 220, however, may not be sufficient to run a great risk of, for example, knowledge transfer or loss of intellectual property.

Figure 3:
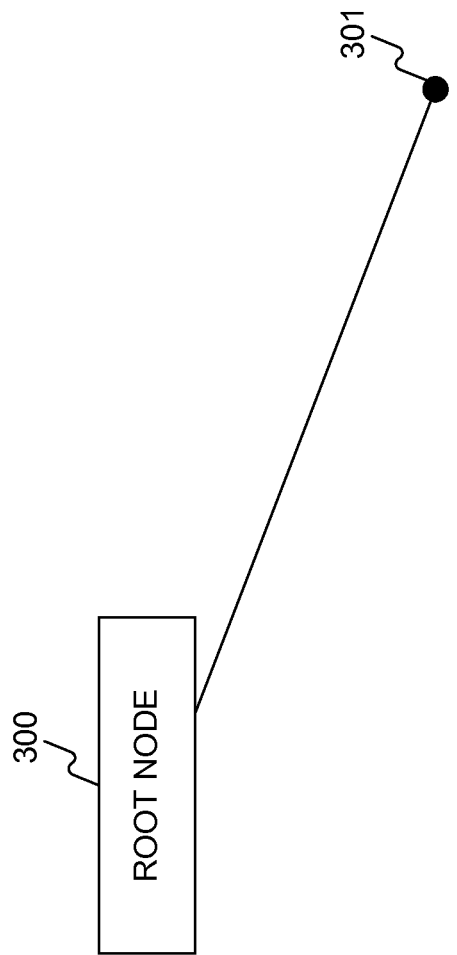
FIGS. 3-5 show an exemplary decision tree that may be used in the decision of outsourcing software development tasks.
Figure 4:
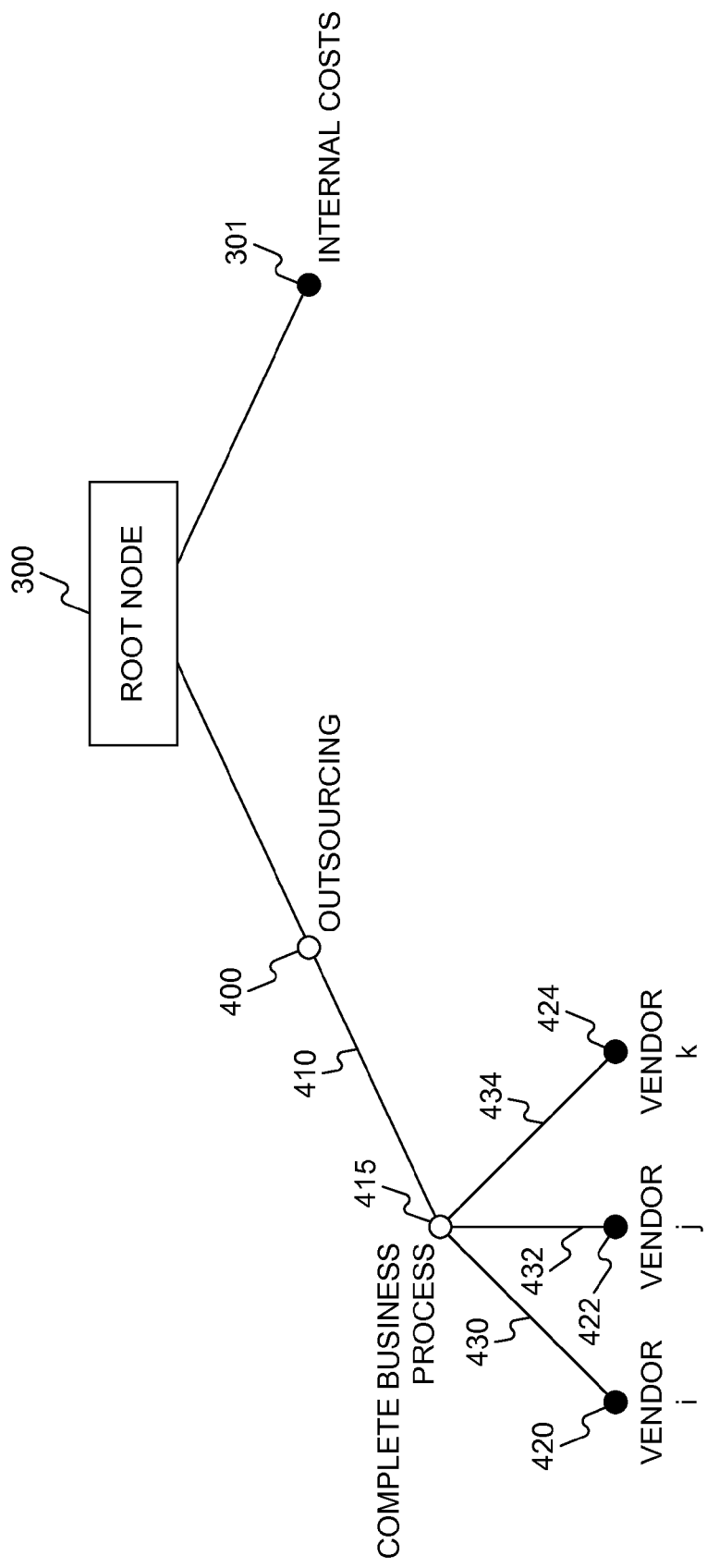
Figure 5:
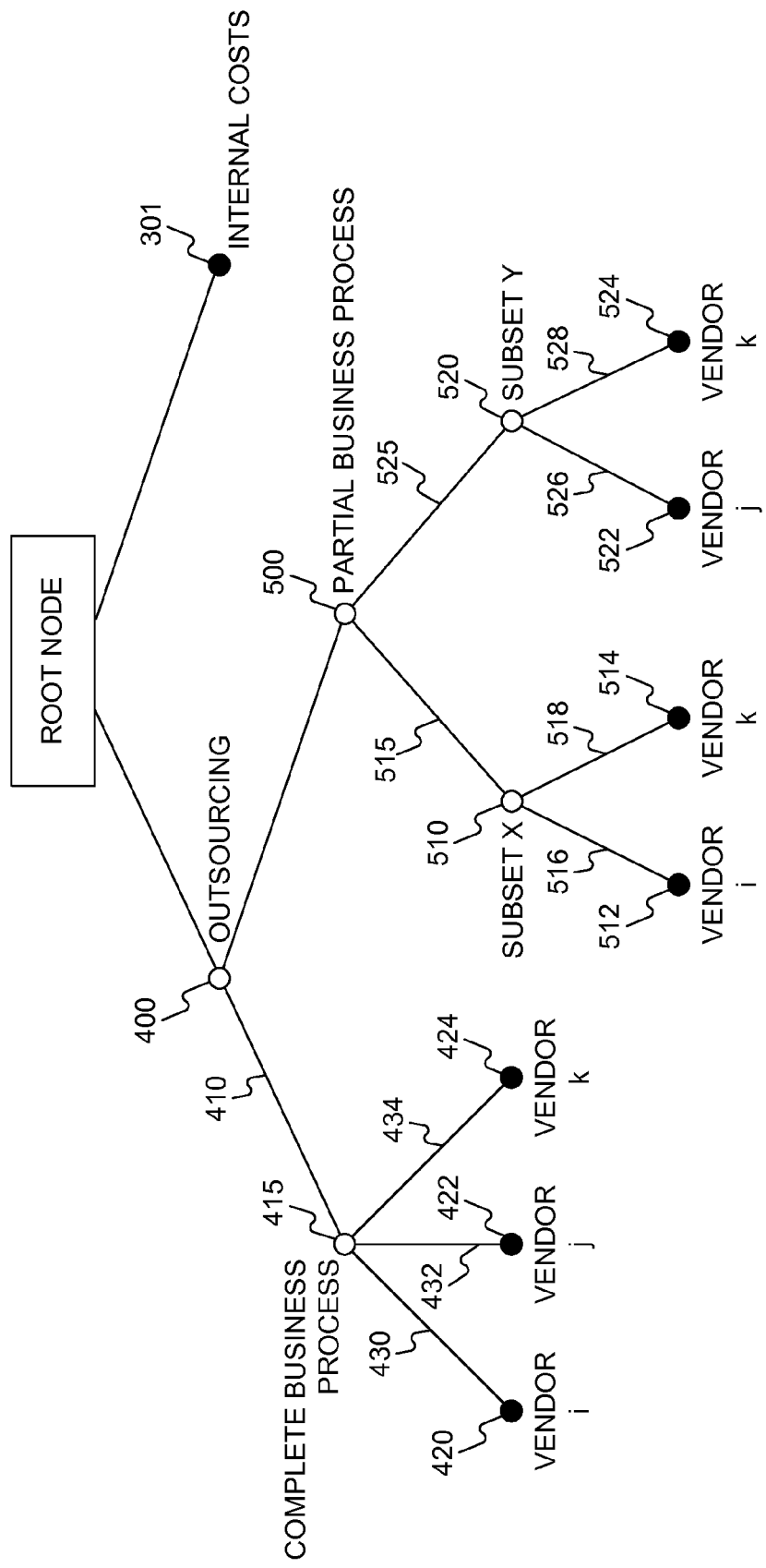

After risks are identified and a risk profile is created, a decision tree is created (step 140). After using the identified risks to create a risk-profile for each task, the software development company may use the risk profiles to build a decision-tree to assist it in making a decision as to which task or tasks to outsource (step 140). FIGS. 3-5 show an exemplary decision-tree that may be used in the decision of outsourcing software development tasks. The decision-tree process may be a multi-stage process, where each stage can be interrelated. At each stage, the organization may make a decision having an associated set of risks and consequences. Further, the decisions made at one stage may affect the risks associated with decisions made at subsequent stages because of the interrelationships existing between stages. For example, the set of risks associated with the decision to outsource Code Development 220 may depend on the decision to outsource Quality Management 225.

The decision-tree based approach may allow the software development company to systematically build a decision-tree risk-profile for each task or set of tasks considered for outsourcing. In some embodiments, the decision-tree based approach may allow the software development company to consider the risks of outsourcing each task or set of tasks to one or more different vendors. By building the decision-tree risk-profile, the software development company may be able to quantify the risks and calculate the expected monetary costs of all possible task-vendor combinations of the risk-profile.

To assist the software development company start the process, root node 300, an exemplary embodiment of which is shown in FIG. 3, may be made from which all outsourcing decisions may depend. Next, the software development company may make a high level calculation by estimating the internal cost of completing all processes in-house. After completing this estimation, the company may place this estimated cost into in-house node 301. When making a decision, the software development company may measure the costs associated with each task-vendor combination against the costs of in-house node 301.

FIG. 4 shows a next step in the exemplary process of building a decision-tree. At this next step, the software development company may determine the business tasks to be outsourced by using its previously completed risk-profile analysis. The company at this step may need to consider the possibilities of outsourcing either the complete business process (CBP) or a subset of the tasks in the CBP, a decision the software development company may make at outsourcing node 400. To make this decision, the software development company may identify the risks associated with each task, possibly using the risk-profile developed earlier. As shown in step 150 in FIG. 1, the company may also identify a set of vendors for each set of tasks considered for outsourcing.

Complete business process node 415 may be used to organize the costs associated with outsourcing the CBP to different vendors. For example, as shown in FIG. 4, the software development company may have identified vendors i, j, and k as possible candidates as vendors for outsourcing the CBP. Accordingly, the software development company may create vendor nodes 420, 422, and 424 as sub-nodes to complete business process node 415.

With each vendor having its own node, the software development company may associate with each vendor's node the risk-percentage for outsourcing the CBP to that specific vendor. The software development company may begin this process by assigning risk percentages to risks shared by all vendors. This risk percentage may be calculated using the previously-identified risks in the task-vendor risk-profiles. For example, a software development company may associate a sixty percent risk of knowledge transfer to outsourcing the CBP to any vendor, regardless of the vendor chosen. The software development company may assign this risk percentage to link 410, which connects outsourcing node 400 with complete business process node 415.

The software development company may then assign risk percentages to risks posed by each individual vendor. The software development company may identify the individual risks by referring to the previously created risk-profiles. The individual risk percentages may be reflected in the links 430, 432, and 434 connecting each vendor node 420, 422, and 424, respectively, to complete business process node 415. The set of all risks taken together for each vendor-process scenario constitutes the decision-tree risk-profile associated with the scenario.

In some instances, the individual risk percentage may represent an increased risk of an event occurring to a specific vendor even though all vendors share some risk of the event occurring. In this case, the software outsourcing company may choose to associate an increased risk percentage for an event occurring to a specific vendor with the link 430, 432, or 434 connecting the specific vendor node 420, 422, or 424 to complete business process node 415. When calculating the increased risk percentage, the software outsourcing company may choose to take into account the risk percentage shared by all vendors and associated with link 410 connecting complete business process node 415 with outsourcing node 400. For example, referring to FIG. 4, outsourcing the CBP to vendor i may represent a risk percentage for knowledge transfer of eighty percent. All vendors, however, may have a sixty percent risk percentage of having knowledge transfer occur, and the software development company may associate this shared sixty percent chance with link 410. The software development company may take into account the shared sixty percent risk percentage when calculating the risk percentage to associate with link 430 connecting node 420 for vendor i to complete business process node 415. For example, the software development company may associate a twenty percent risk of knowledge transfer with link 430.

A software development company may associate individual risks for outsourcing the complete business process to a specific vendor with the link connecting that vendor to complete business process node 415. Referring to FIG. 4, vendor i, for example, may be subject to a specific risk of work stoppages because of the geographic location of the vendor's employees. Vendor j and k may not be subject to this risk. The risk percentage for work stoppages for vendor i may be sixty percent. Some software outsourcing companies may choose to associate this sixty percent risk percentage with link 430 connecting vendor node 420 for vendor i with complete business process node 415. The software outsourcing company may choose to associate multiple individual risks pertaining to vendor i with link 430. The software development company may choose to associate one or more of an increased risk percentage and an individual risk percentage with one or more of the links connecting vendor nodes 420, 422, and 424 to complete business process node 415.

FIG. 5 shows a similar process for determining the risks for outsourcing a subset of the tasks of the CBP. The risk percentages associated with each subset-vendor pair may be grouped under partial business process node 500. In the exemplary decision-tree shown in FIG. 5, a software development company may consider outsourcing two subsets of the CBP, subset X and subset Y. Each subset may receive its own node, such as, for example, node 510 for subset X and node 520 for subset Y.

Shared risk percentages for outsourcing a subset of the CBP to any vendor may be associated with the link connecting that subset to partial business process node 500. For example, a software development company may face a forty percent risk of having knowledge transfer occur when outsourcing subset X, regardless of the vendor chosen. The software development company may also face a thirty-five percent risk of losing intellectual property when outsourcing subset X, regardless of the vendor chosen. Accordingly, the software development company may associate this forty percent risk and thirty-five percent risk with link 515 connecting subset X node 510 with partial business process node 500. The software development company may face similar or different risks for outsourcing subset Y. The risk percentages associated with these risks may be associated with link 525 connecting subset Y node 520 with partial business process node 500.

A software development company may associate individual risks for outsourcing a specific subset of the tasks of the CBP to a specific vendor with the link connecting that vendor to the specific subset node 510 or 520. For example, outsourcing subset X of the CBP to vendor i may involve a fifty-five percent risk of work stoppages because of the threat of a volcano eruption near the facilities used by vendor i. In this case, the software development company may associate this work stoppage risk percentage with link 516 connecting vendor node 512 to subset X node 510. Each of links 516, 518, 526, and 528 may have individual risk percentages associated with specific risks for outsourcing a specific subset of tasks of the CBP to an individual vendor.

The same vendor may have the same or different risk percentages for different subsets of the CBP. For example, different risk percentages may be associated with links 518 and 528 even though both links connect to vendor nodes 514 and 524, respectively, for vendor k. This situation may occur, for example, when the same vendor completes different tasks for developing software in different locations, where each location may have different demographic risks.

In some instances, the individual risk percentage may represent an increased risk of an event occurring to a specific vendor for a specific subset of tasks of the CBP even though all vendors share some risk of the event occurring. In this case, the software development company may choose to associate an increased risk percentage for an event occurring to a specific vendor with the link 516, 518, 526, or 528 connecting the specific vendor to subset nodes 510 and 520. When calculating the increased risk percentage, the software outsourcing company may choose to take into account the risk percentage shared by all vendors and included in links 515 or 525 connecting the specific subset nodes 510 and 520, respectively, with partial business process node 500. For example, referring to FIG. 5, outsourcing subset Y of the CBP to vendor k may represent a risk percentage for losing intellectual property of twenty percent. All vendors considered for subset Y, however, may have a fifteen percent risk percentage of losing intellectual property, and the software development company may associate this shared fifteen percent chance with link 525 connecting subset Y node 520 with partial business process node 500. The software development company may take into account the shared fifteen percent risk percentage when calculating the risk percentage to associate with link 528, which connects subset Y node 520 with vendor k node 524.

The company may arrive at the values of the risk percentages using various methods. For example, the software development company may use a scale, such as 1-10, to objectively rate each of the associated risk percentages on the scale. The company may assign low, medium, and high probabilities to each of the risk percentages. For example, low (0.3), medium (0.6), and high (0.9) values may be assigned to each risk, and the corresponding percentage may be associated with the appropriate risk level. The company may determine probability distributions that model the probability of the occurrence of a risk. The company may then draw a value from this probability distribution to specify the probability of the occurrence of the associated risk.

After assigning the risk percentages to each of the vendor-process scenarios, the software development company may calculate the expected cost for each scenario, as shown in step 160 in FIG. 1. In some embodiments in which the entire business process is outsourced the expected cost may be calculated as:

$$E(\text{cost of scenario } i) = \text{cost}_i \times p_{cbp} \times p_{vi}$$

In this equation, costs equals the estimated cost of scenario i; $p_{cbp}$, the probability of the occurrence of the risks associated with outsourcing the CBP; and $p_{vi}$, the probability of the occurrence of the risks associated with outsourcing the CBP to vendor i. The estimated cost of outsourcing scenario i may be calculated using known methods in the art of business planning. Each of the probabilities for the occurrence of a risk may be calculated using any or a combination of the methods explained above. Each of these probabilities may be calculated using known methods in the art.

Similar equations may be obtained for the expected cost of outsourcing a subset of tasks of the CBP to a particular vendor. This process may be accomplished by substituting $p_{pbp-X}$, the risk percentage of the occurrence of the risks associated with outsourcing subset X of the CBP, for $p_{cbp}$. The various scenarios may be compared based on the expected costs, allowing the software development company to make an informed choice as shown in step 170 of FIG. 1.

Instead of a single percentage, such as, for example, $p_{cbp}$, for calculating the expected cost, the software development company may use a range of percentages. The range of percentages may include $p_{cbp,l}$, which represents the low probability for the occurrence of a risk when outsourcing the CBP, and $p_{cbp,h}$, which represents the high percentage for the occurrence of a risk when outsourcing the CBP. The range of risk percentages may be used for calculating a range for the expected costs for outsourcing the CBP or each subset of tasks of the CBP.

The software development company may use an equation for calculating expected costs that further penalizes riskier task-vendor scenarios. For example, if a company incurs more risk when outsourcing a particular business task or when choosing to outsource to a particular vendor, then the risk adjusted expected cost may be estimated as:

$$E(\text{cost of scenario } i) = \text{cost}_i + \text{cost}_i \times p_{cbp} \times p_{vi}$$

In this equation, a company may use any known method to determine the value of the estimated cost, $\text{cost}_i$, but the more risk involved in outsourcing a particular business process or outsourcing to a particular vendor, the higher the value of $\text{cost}_i$. The value for the percentage risk for the occurrence of a risk, $p_{cbp}$, and the risk percentage associated with the vendor, $p_{vi}$, may be higher the more risk that is involved. In contrast to a high risk scenario, the value of $p_{cbp}$ for a vendor-business process scenario involving little risk may be close to zero. Accordingly, the expected cost for a vendor-business process scenario involving little risk may be close to the estimated cost calculated by the company for outsourcing the CBP or a subset of tasks of the CBP. Using this equation to calculate expected costs may discourage a company from entering into particularly risky task-vendor scenarios.

As shown in step 180 of FIG. 1, the software development company may evaluate the performance of the outsourcing vendors on an on-going basis after outsourcing a business task or set of tasks. The primary goal of a software organization may be to ensure that a high quality product, meeting specified requirements, debuts in the market at the right time. The primary goal of a software development company may be to maximize net revenue. Accordingly, the company may wish to measure the performance of the outsourcing vendor to ascertain if the vendor is assisting the company in attaining its goals. In fact, the vendor may be expected to out-perform the expected internal performance of the software development company at the same tasks, failing which the decision to outsource may lose its rationality.

To ensure that the vendor is contributing towards the goals of the software development company, the company may need to evaluate its outsourcing decision on a continuous basis, taking corrective actions as needed. Such evaluation may be performed with the understanding that optimal sub-systems do not guarantee optimality of the overall process. In the case of outsourcing software development tasks, the vendor may perform well, but the overall performance may be suboptimal because of integration and other issues. Therefore, the vendor performance as well as the overall performance of the process may be evaluated simultaneously. To achieve this result, the organization may define key performance indicators (KPI) to measure both the vendor and process performance.

The KPIs to measure vendor performance may include factors such as cost, on-time delivery, code quality, and software performance. Most of these KPIs may be tangible and directly related to the vendor. The cost component may be measured against the expected cost for performing similar function internally within the software development company. Cost overruns may be a factor when measuring this KPI. On-time delivery may be measured against specified due dates. A good measure of code quality may be the number of bugs in the developed code. Finally, software performance may be measured against metrics such as computational performance, load time, scalability, and performance as perceived by the users.

The business process KPIs may include measures such as the total cost of developing the software, its functional completeness, cost of integration, knowledge transfer/communication, and deployment. The functional completeness of the product may be measured against the product specification. Cost of integration and knowledge transfer may be difficult to determine as they may include opportunity costs. Further, an accurate estimate of the deployment cost might not be forthcoming if consulting is not part of the software development company. Accordingly, measuring the business process KPI may be more challenging than measuring the vendor KPI.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A non-transitory computer program product comprising a machine readable medium on which is provided program instructions for determining an expected cost to outsource one or more tasks in a business process to a set of vendors, the computer program product comprising:
    code for identifying a set of base criteria of the company;
    code for identifying a set of risks for outsourcing each task or set of tasks in the business process, the set of risks being based, at least in part, on the set of base criteria;
    code for creating a first set of risks that contains risks shared by all vendors in the set of vendors;
    code for creating a second set of risks that contains risks associated with outsourcing the business process to a vendor in the set of vendors;
    code for associating one or more risks in the first and second sets of risks with each task or set of tasks in the business process to create a risk-profile;
    code for determining a set of probabilities that correspond to the occurrence of each of the one or more risks in the risk-profile, wherein a probability is selected for each risk from an associated probability distribution that models the occurrence of an associated risk;
    code for determining an estimated cost for each task or set of tasks in the business process; and
    code for calculating the expected cost as a function of the set of probabilities and the determined estimated cost.

2. The non-transitory computer program product of claim 1, wherein the code for calculating the expected cost using the set of probabilities further comprises:
    code for determining a first probability that corresponds to the probability of the occurrence of the first set of risks in the risk-profile;
    code for determining a second probability that corresponds to the probability of the occurrence of second set of risks in the risk-profile;
    code for multiplying the estimated cost with the first probability to create a first product; and
    code for multiplying the first product with the second probability to create the expected cost.

3. The non-transitory computer program product of claim 2, further comprising computer code for automatically updating the expected cost when new values are entered for at least one of the estimated cost, the first probability, or the second probability.

4. The non-transitory computer program product of claim 2, further containing code for choosing at least one of the first or second probabilities from a list that contains a set of integers wherein each integer is associated with a probability.

5. The non-transitory computer program product of claim 2, further containing code for choosing at least one of the first or second probabilities from a list that contains a set of categories wherein each category is associated with a probability.

6. The non-transitory computer program product of claim 5, wherein at least one of the first and second probabilities is modeled by using a probability distribution that models the probability of the occurrence of the risk.

7. A method, performed by one or more processors executing program instructions stored on one or more memories, causing the one or more processors to perform the method comprising:
    identifying a set of base criteria of the company;
    identifying a set of risks for outsourcing each task or set of tasks in the business process, the set of risks being based, at least in part, on the set of base criteria;
    creating a first set of risks that contains risks shared by all vendors in the set of vendors;
    creating a second set of risks that contains risks associated with outsourcing the business process to a vendor in the set of vendors;
    associating one or more risks in the first and second sets of risks with each task or set of tasks in the business process to create a risk-profile;
    determining a set of probabilities that correspond to the occurrence of each of the one or more risks in the risk-profile, wherein a probability is selected for each risk from an associated probability distribution that models the occurrence of an associated risk;

determining an estimated cost for each task or set of tasks in the business process; and calculating the expected cost as a function of the set of probabilities and the determined estimated cost.

8. The method of claim 7, wherein calculating the expected cost using the set of probabilities further comprises:

determining a first probability that corresponds to the probability of the occurrence of the first set of risks in the risk-profile;

determining a second probability that corresponds to the probability of the occurrence of second set of risks in the risk-profile;

multiplying the estimated cost with the first probability to create a first product; and multiplying the first product with the second probability to create the expected cost.

9. The method of claim 8, further comprising automatically updating the expected cost when new values are entered for at least one of the estimated cost, the first probability, or the second probability.

10. The method of claim 8, further comprising choosing at least one of the first or second probabilities from a list that contains a set of integers wherein each integer is associated with a probability.

11. The method of claim 8, further comprising choosing at least one of the first or second probabilities from a list that contains a set of categories wherein each category is associated with a probability.

12. The method of claim 11, wherein at least one of the first and second probabilities is modeled by using a probability distribution that models the probability of the occurrence of the risk.

13. A system for determining an expected cost to outsource one or more tasks in a business process to a set of vendors, the system comprising:

one or more processors configured to execute one or more modules; and a memory storing the one or more modules, the modules comprising:

code for identifying a set of base criteria of the company;

code for identifying a set of risks for outsourcing each task or set of tasks in the business process, the set of risks being based, at least in part, on the set of base criteria;

code for creating a first set of risks that contains risks shared by all vendors in the set of vendors;

code for creating a second set of risks that contains risks associated with outsourcing the business process to a vendor in the set of vendors;

code for associating one or more risks in the first and second sets of risks with each task or set of tasks in the business process to create a risk-profile;

code for determining a set of probabilities that correspond to the occurrence of each of the one or more risks in the risk-profile, wherein a probability is selected for each risk from an associated probability distribution that models the occurrence of an associated risk;

code for determining an estimated cost for each task or set of tasks in the business process; and code for calculating the expected cost as a function of the set of probabilities and the determined estimated cost.

14. The system of claim 13, wherein the code for calculating the expected cost using the set of probabilities further comprises:

code for determining a first probability that corresponds to the probability of the occurrence of the first set of risks in the risk-profile;

code for determining a second probability that corresponds to the probability of the occurrence of second set of risks in the risk-profile;

code for multiplying the estimated cost with the first probability to create a first product; and code for multiplying the first product with the second probability to create the expected cost.

15. The system of claim 14, further comprising computer code for automatically updating the expected cost when new values are entered for at least one of the estimated cost, the first probability, or the second probability.

16. The system of claim 14, further containing code for choosing at least one of the first or second probabilities from a list that contains a set of integers wherein each integer is associated with a probability.

17. The system of claim 14, further containing code for choosing at least one of the first or second probabilities from a list that contains a set of categories wherein each category is associated with a probability.

18. The system of claim 17, wherein at least one of the first and second probabilities is modeled by using a probability distribution that models the probability of the occurrence of the risk.

* * * * *